(No Model.)
A. NIEMCZYK.
GAS MOTOR.
No. 508,042.　　　　　　　　Patented Nov. 7, 1893.
FIG-1-
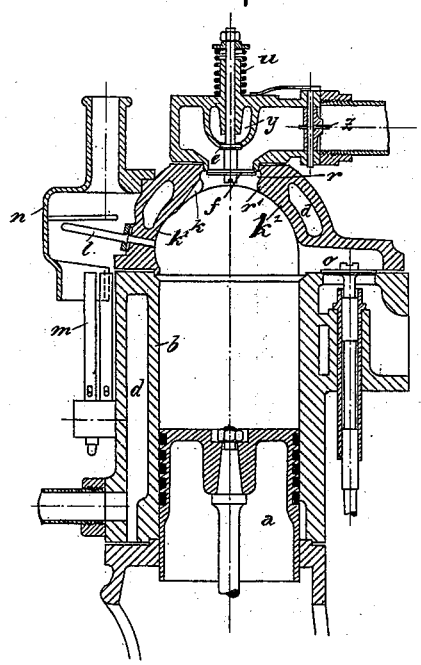
FIG-2-
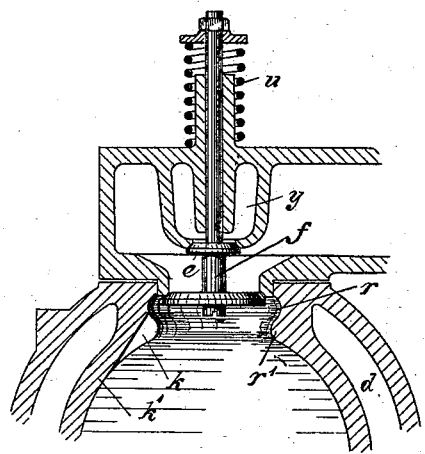
Witnesses:
Theodor Steudel
Paul Hirschke
Inventor:
Anton Niemczyk,
per Gerson and Sachse
his Attorneys.

UNITED STATES PATENT OFFICE.

ANTON NIEMCZŸK, OF LEIPSIC, GERMANY.

GAS-MOTOR.

SPECIFICATION forming part of Letters Patent No. 508,042, dated November 7, 1893.

Application filed May 10, 1892. Serial No. 432,531. (No model.)

*To all whom it may concern:*

Be it known that I, ANTON NIEMCZŸK, a subject of the Emperor of Germany, residing at Leipsic-Eutritzsch, in the Empire of Germany, have invented a new and useful Gas-Motor, of which the following is a specification.

The object of this invention is a peculiar arrangement in gas motors for attaining a good mixture of gas and air and a secure ignition of the mixture.

Referring to the accompanying drawings, Figure 1 is a longitudinal section of the cylinder of a gas motor showing the new arrangement and Fig. 2 an enlarged section of the upper part of the cylinder.

The piston $a$ is connected in the usual way by piston-rod, cross head, and drawing rod with the shaft on which is wedged the flywheel. The cylinder $b$ is provided with an extension $k'$ serving as compression or combustion chamber and which may be designated as compression space.

$d$ is a water duct surrounding the cylinder and the combustion space.

$e$ and $f$ are two valves connected by one and the same rod and pressed upon their seats by the spring $u$. Through valve $e$ the gas coming from the duct $y$ and through valve $f$ the gas and air together are to flow into the cylinder.

$y$ is the admission duct for the gas and $z$ the inlet for the air.

$r$ is a bulged extension which is narrowed again at $r'$. This bulged extension which is narrowed below serves for the mixing of the gas with the air.

$l$ is an igniting tube for inflaming the charge, which is made from aluminium bronze.

$m$ is a gas lamp for heating the igniting tube.

$n$ is a chimney for the flame of the lamp.

$o$ is the valve through which the products of combustion are to escape.

If the piston $a$ is moved from top to bottom, thereby the space $k'$, which is designated as combustion space and into which the piston $a$ never penetrates, will be enlarged. The increase of space causes rarefaction of the air and this rarefaction causes the pressure of the outer atmosphere to open the valve $f$. At the same time therewith also the valves $e$ and $f$ open. Air and gas penetrate in conjunction into the cylinder $b$. By the striking of gas and air against the bulging $r$ a gyratory movement is produced, which effects a mixing of air and gas. While the valve cone $f$ closes the combustion chamber or "compression space" $k'$, the valve $e$ serves for closing the gas inlet $y$. A partial mixture of gas and air is already effected by both fluids flowing simultaneously through valve $f$. In the bulging $r$ another mixing takes place. As shown in the drawings, the side of the combustion space $k'$ is cut out at $k$. Said cut extends into the bulging $r'$ and reaches downwardly to the igniting channel to which the igniting tube is fastened. This cutting out has for its purpose to allow the gas mixture to flow on its admission direct to the igniting duct while in general the gas mixture is allowed to more or less mix with the residues of combustion.

What I claim is—

In the cylinder of a gas motor the combination of the igniting tube $l$, the gas inlet valve $e$, the gas and air inlet valve $f$ and the bulged parts $r$ $r'$ with the cut-away portion $k$ extending through the bulging $r$ and constituting a direct way from the valve $e$ to the igniting tube $l$ as and for the purpose specified.

ANTON NIEMCZŸK.

Witnesses:
CARL BORNGRAEBER,
OSCAR BRÜNLER.